United States Patent
Nguyen et al.

(10) Patent No.: US 6,263,309 B1
(45) Date of Patent: *Jul. 17, 2001

(54) MAXIMUM LIKELIHOOD METHOD FOR FINDING AN ADAPTED SPEAKER MODEL IN EIGENVOICE SPACE

(75) Inventors: Patrick Nguyen, Isla Vista; Roland Kuhn; Jean-Claude Junqua, both of Santa Barbara, all of CA (US)

(73) Assignee: Matsushita Electric Industrial Co., Ltd.

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,054

(22) Filed: Apr. 30, 1998

(51) Int. Cl.⁷ .................................................. G10L 15/08
(52) U.S. Cl. ......................... 704/239; 704/231; 704/236
(58) Field of Search .................................. 704/231, 255, 704/256

(56) References Cited

U.S. PATENT DOCUMENTS

| | | |
|---|---|---|
| 4,718,088 | 1/1988 | Baker et al. . |
| 4,817,156 | 3/1989 | Bahl et al. . |
| 4,829,577 | 5/1989 | Kuroda et al. . |
| 4,903,035 | 2/1990 | Kropielnicki et al. . |
| 5,046,099 | 9/1991 | Nishimura . |
| 5,050,215 | 9/1991 | Nishimura . |
| 5,127,055 | 6/1992 | Larkey . |
| 5,150,449 | 9/1992 | Yoshida et al. . |
| 5,170,432 | * 12/1992 | Hackbarth et al. ................. 704/231 |
| 5,233,681 | 8/1993 | Bahl et al. . |
| 5,280,562 | 1/1994 | Bahl et al. . |
| 5,293,584 | 3/1994 | Brown et al. . |
| 5,375,173 | * 12/1994 | Sanada et al. ...................... 704/231 |

(List continued on next page.)

OTHER PUBLICATIONS

V. Digalakis, et al., Rapid speech recognizer adaptation to new speakers, Tech. Univ. of Crete, Chania, Greece, pp. 765–768, vol. 2, Mar. 1999.

(List continued on next page.)

*Primary Examiner*—Fan Tsang
*Assistant Examiner*—Michael N. Opsasnick
(74) *Attorney, Agent, or Firm*—Harness, Dickey & Pierce, P.L.C.

(57) ABSTRACT

A set of speaker dependent models is trained upon a comparatively large number of training speakers, one model per speaker, and model parameters are extracted in a predefined order to construct a set of supervectors, one per speaker. Principle component analysis is then performed on the set of supervectors to generate a set of eigenvectors that define an eigenvoice space. If desired, the number of vectors may be reduced to achieve data compression. Thereafter, a new speaker provides adaptation data from which a supervector is constructed by constraining this supervector to be in the eigenvoice space based on a maximum likelihood estimation. The resulting coefficients in the eigenspace of this new speaker may then be used to construct a new set of model parameters from which an adapted model is constructed for that speaker. Environmental adaptation may be performed by including environmental variations in the training data.

4 Claims, 5 Drawing Sheets

U.S. PATENT DOCUMENTS

| | | | |
|---|---|---|---|
| 5,473,728 | * 12/1995 | Luginbuhl et al. | 704/253 |
| 5,522,011 | 5/1996 | Epstein et al. | |
| 5,579,436 | 11/1996 | Chou et al. | |
| 5,617,486 | 4/1997 | Chow et al. | |
| 5,651,094 | 7/1997 | Takagi et al. | |
| 5,664,059 | 9/1997 | Zhao . | |
| 5,737,723 | 4/1998 | Riley et al. | |
| 5,778,342 | 7/1998 | Erell et al. | |
| 5,787,394 | * 7/1998 | Bahl et al. | 704/238 |
| 5,793,891 | * 8/1998 | Takahashi et al. | 382/228 |
| 5,794,192 | * 8/1998 | Zhao | 704/244 |
| 5,806,029 | 9/1998 | Buhrke et al. | |
| 5,812,975 | 9/1998 | Kormori et al. | |
| 5,825,978 | 10/1998 | Digalakis et al. | |
| 5,839,105 | * 11/1998 | Ostendorf et al. | 704/256 |
| 5,842,163 | 11/1998 | Weintraub . | |
| 5,864,810 | * 1/1999 | Digalakis | 704/255 |
| 5,890,114 | 3/1999 | Yi . | |
| 5,895,447 | * 4/1999 | Ittycheriah et al. | 704/231 |

OTHER PUBLICATIONS

S.J. Cox, et al., Simultaneous speaker normalisation and utterance labelling using Bayesian/neural net techniques, British Telecom Res. Lab., Ipswich, UK, pp. 161–164, vol. 1, Apr. 1990.

Yunxin Zhao, An acoustic–phonetic–based speaker adaptation technique for improving speaker–independent continuous speech recognition, Speech technol. Lab., Panasonic Technol. Inc., Santa Barbara, CA, USA, pp. 380–394, vol. 2, Jul. 1994.

V. Abrash et al., Acoustic adaptation using nonlinear transformations of HMM parameters, Speech Res. & Technol. Lab., SRI Int., Menlo Park, CA, USA, pp. 729–732, vol. 2, May 1996.

R. Kuhn, et al., Eigenfaces and eigenvoices: dimensionality reduction for specialized pattern recognition, Panasonic Technol.–STL, Santa Barbara, CA, USA, pp. 71–76, Dec. 1998.

J.–L. Gauvain, et al., Improved acoustic modeling with Bayesian learning, AT&T Bell Labs., Murray Hill, NJ, USA, pp. 481–484, vol. 1, Mar. 1992.

Ming–Whei Feng, Speaker Adaptation Based on Spectral Normalization and Dynamic HMM Parameter Adaptation, GTE Laboratories Inc., IEEE, 1995, pp. 704–707.

J. McDonough, et al., Speaker–adapted training on the Switchboard Corpus, BBN Syst. & Technols., Cambridge, MA, USA, pp. 1059–1062, vol. 2, Apr. 1997.

Brian Mak, et al., Phone Clustering Using the Bhattacharyya Distance, Center for Spoken Language Understanding, Oregon Graduate Institute of Science and Technology.

W. Chou, et al., Segmental GPD Training of HMM Based Speech Recognizer, AT&T Bell Laboratories, IEEE, Sep. 1992, pp. I–473–I–476.

Alejandro Acero, et al., Speaker and Gender Normalization for Continuous–Density Hidden Markov Models, Microsoft Corporation, IEEE, Mar. 1996, pp. 342–345.

Ariane Lazarides, et al., Improving Decision Trees for Acoustic Modeling, Locus Speech Corporation, pp. 1053–1056.

Roland Kuhn, et al., Improved Decision Trees for Phonetic Modeling, Centre de recherche informatique de Montreal, IEEE, May 1995, pp. 552–555.

Yunxin Zhao, Overcoming Speaker Variability in Automatic Speech Recognition, The Speaker Adaptation Approach, pp. 191–209.

Chapters 9 and 10 of Talker Variability in Speech Processing, pp. 167–189, Academic Press, 1997.

P. Belhumeur, J. Hespanha, and D. Kriegman, "Eigenfaces vs. Fisherfaces: Recognition Using Class Specific Linear Projection", IEEE Trans. Pattern Analysis and Machine Intelligence, v. 19, No. 7, pp. 711–720, Jul. 1997.

J.–L. Gauvain and C.–H. Lee. "Maximum a Posteriori Estimation for Multi–variate Gaussian Mixture Observations of Markov Chains", IEEE Transactions on Speech and Audio Processing, v. 2, No. 2, pp. 291–298, Apr. 1994.

M. Hunt, S. Richardson, et al., "An Investigation of PLP and IMELDA Acoustic Representations and of their Potential of Combination", Proc. Int. Conf. on Acoustics, Speech, and Signal Processing, pp. 881–884, May 1991.

C. Leggetter and P. Woodland. "Speaker Adaptation of Continuous Density HMMs Using Linear Regression". Proceedings of the International Conference on Spoken Language Processing, v. 2, pp. 451–454, Yokohama, Japan, 1994.

C. Leggetter and P. Woodland. "Maximum likelihood linear regression for speaker adaptation of continuous density hidden Markov models". Computer Speech and Language. V. 9, pp. 171–185, 1995.

B. Moghaddam and A. Pentland, "Probabilistic Visual Learning for Object Representation", IEEE Trans. Pattern Analysis and Machine Intelligence, V. 19, No. 7, pp. 696–710, Jul. 1997.

S. Ahadi–Sarkani. "Bayesian and Predictive Techniques for Speaker Adaptation". Ph.D. thesis, Cambridge University, Jan. 1996.

M.J.F. Gales. "The Generation and Use of Regression Class Trees for MLLR Adaptation", TR 263, technical report, Cambridge University, Aug. 1996.

M.J.F. Gales. "Maximum likelihood linear transformations for HMM–based speech recognition", TR 291, technical report, Cambridge University, May 1997.

C. Leggetter and P. Woodland. "Speaker adaptation of HMMs using linear regression", TR 181, technical report, Cambridge University, Jun. 1994.

P. Nguyen, C. Wellekens, and J.–C. Junqua, "Maximum Likelihood Eigenspace and MLLR for Speech Recognition in Noisy Environments", Eurospeech–99, V.6, pp. 2519–2522, Budapest, Hungary, Sep. 1999.

* cited by examiner

MAXIMUM LIKELIHOOD METHOD FOR FINDING AN ADAPTED SPEAKER MODEL IN EIGENVOICE SPACE

BACKGROUND AND SUMMARY OF THE INVENTION

The present invention relates generally to speech recognition and more particularly to speaker adaptation whereby the parameters of a speech recognition model are revised to better recognize the speech of a new speaker.

Speech recognition systems may be speaker dependent or speaker independent. Speaker dependent systems are trained to understand what a single individual says, by being given a large number of examples of words uttered by that individual (these examples are called the "training data"). Speaker dependent systems tend to be very accurate for the individual they are trained on, and inaccurate for everybody else. Speaker independent systems are designed to be used by anybody who speaks the language of the application; typically, they are trained on data from many different people. The error rate for a speaker independent system, carrying out recognition on a speaker not in the training data, is roughly two to three times higher than the error rate for a comparable speaker dependent system carrying out recognition on the speaker it is trained on.

In an effort to improve performance, many speech recognition systems include facilities for performing speaker adaptation, whereby the speech recognition system is adjusted during use to reduce the error rate. There are basically three speaker adaptation approaches described in the current technical literature. These are:

(1) Speaker normalization (also called "transformation")—observations of the digitized signal generated by the new speaker feature vectors are transformed to resemble more closely observations from a reference speaker, for whom a speaker dependent system has been trained. In some instances the transformation is in the opposite direction: a reference pattern is transformed to resemble the data from the new speaker more closely.

(2) Speaker clustering—observations of the new speaker are used to select a cluster of training speakers; each cluster is associated with a complete set of Hidden Markov Models (HMMs) trained only on the speakers in this cluster. Once the cluster most suitable for the speaker has been chosen, recognition is carried out using only HMMs from this cluster.

(3) Model adaptation—certain HMM parameters are updated to reflect aspects of the adaptation data. The two most popular model adaptation techniques are maximum a posterior estimation (MAP) and maximum likelihood linear regression (MLLR).

While each of these adaptation techniques has proven to be beneficial, none is without some drawback. Generally speaking, the more effective adaptation techniques tend to require significant computational resources and also require a significant training effort on the part of the individual speaker.

The present invention brings an entirely new technique with which to carry out speaker and environment adaptation. The technique enables an initially speaker independent recognition system to quickly attain a performance level on new speakers and new acoustic environments that approach speaker dependent systems, without requiring large amounts of training data for each new speaker. We call our technique "eigenvoice adaptation." The technique employs an offline step in which a large collection of speaker dependent models is analyzed by principal component analysis (PCA), yielding a set of eigenvectors that we call "eigenvoice vectors" or "eigenvoices." This offline step is fairly computationally intensive, although it has to be performed only once. After that, each time the speech recognition system is used, it carries out a computationally inexpensive operation on adaptation data obtained from the new speaker, to obtain a vector in the space spanned by the eigenvoices. This new vector gives the adapted model for the new speaker.

More specifically, the present invention employs a maximum likelihood technique for placing the new vector into the space spanned by the eigenvoices. The maximum likelihood technique involves constructing an auxiliary function based on the observation data from the new speaker and also based on the knowledge of how the Hidden Markov Models are constructed. Using this auxiliary function, a maximum likelihood vector is obtained by taking derivatives and finding the local maxima. This maximum likelihood vector is thus inherently constrained within the space spanned by the eigenvoices and represents the optimal representation within that space for the new speaker given the available input speech data.

The maximum likelihood technique employed by the invention offers a number of important advantages. First, the adapted model constructed from the maximum likelihood vector always generates the optimal set of HMM models, given the quantity of observation data. Second, although the maximum likelihood technique involves some computation, the computational burden is quite inexpensive because the eigenvoice representation dramatically reduces the number of parameters needed to describe a person's speech. Whereas typical Hidden Markov Model representations involve thousands of floating point number parameters, the eigenvoice representation of the invention requires far fewer parameters; a typical embodiment might employ 25–100 parameters to represent a given speaker, although the system will work with even fewer parameters than these. Computational burden is also significantly reduced with the present invention because the eigenvectors are orthogonal, allowing the maximum likelihood computation to be performed by solving a set of linear equations that a computer can calculate quite readily.

Third, the observation data does not have to include examples of each and every sound unit prescribed by the Hidden Markov Models. Thus, the maximum likelihood technique will work even if data for some of the sound units are missing. In contrast, placing the new speaker's parameters in eigenspace using a projection operation requires the speaker to utter at least one example of each and every sound unit prescribed by the Hidden Markov Models. In practical terms, the maximum likelihood technique will allow construction of a robust adapted model based on a very short, and potentially incomplete, training session. The technique thus lends itself to speaker and environment adaptation applications where a large quantity of adaptation data may not be available. For example, the technique would work well in a speech-enabled interactive marketing system where the new speaker responds by telephone to system navigation prompts and the system adapts to the new speaker automatically as the speaker proceeds to navigate through the system to place an order.

For a more complete understanding of the invention, its objects and advantages, refer to the following specification and to the accompanying drawings.

DESCRIPTION OF THE PREFERRED EMBODIMENT

To better understand the speaker adaptation technique of the invention, a basic understanding of the speech recognition system will be helpful. Most present day speech recognizers employ Hidden Markov Models (HMMs) to represent speech. The Hidden Markov Model is a modeling approach involving state diagrams. Any speech unit (such as a phrase, word, subword, phoneme or the like) can be modeled, with all knowledge sources included in that model. The HMM represents an unknown process that produces a sequence of observable outputs at discrete intervals, the outputs being members of some finite alphabet (corresponding to the predefined set of speech units). These models are called "hidden" because the state sequence that produced the observable output is not known.

Figure 1:
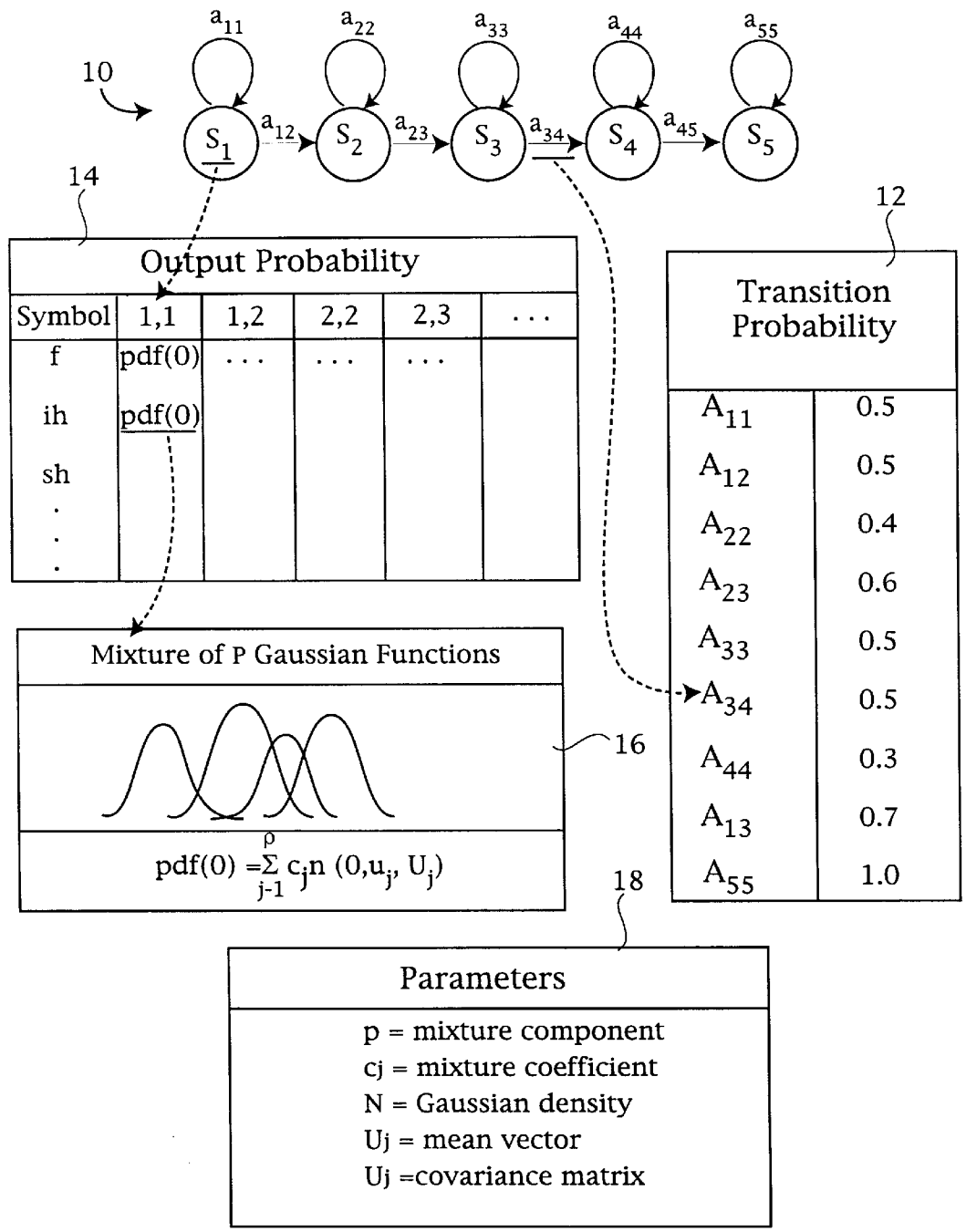
FIG. 1 illustrates an exemplary Hidden Markov Model (HMM), useful in understanding the invention.

As illustrated in FIG. 1, an HMM 10 is illustrated by a set of states ($S_1$, $S_2$ . . . $S_5$), vectors that define transitions between certain pairs of states, illustrated as arrows in FIG. 1, and a collection of probability data. Specifically, the Hidden Markov Model includes a set of transition probabilities 12 associated with the transition vectors and a set of output probabilities 14 associated with the observed output at each state. The model is clocked from one state to another at regularly spaced, discrete intervals. At clock-time, the model may change from its current state to any state for which a transition vector exists. As illustrated, a transition can be from a given state back to itself.

The transition probabilities represent the likelihood that a transition from one state to another will occur when the model is clocked. Thus, as illustrated in FIG. 1, each transition has associated with it a probability value (between 0 and 1). The sum of all probabilities leaving any state equals 1. For illustration purposes, a set of exemplary transition probability values has been given in transition probability Table 12. It will be understood that in a working embodiment these values would be generated by the training data, with the constraint that the sum of all probabilities leaving any state equals 1.

Every time a transition is taken, the model can be thought of as emitting or outputting one member of its alphabet. In the embodiment illustrated in FIG. 1, a phoneme-based speech unit has been assumed. Thus the symbols identified in output probability Table 14 correspond to some of the phonemes found in standard English. Which member of the alphabet gets emitted upon each transition depends on the output probability value or function learned during training. The outputs emitted thus represent a sequence of observations (based on the training data) and each member of the alphabet has a probability of being emitted.

In modeling speech, it is common practice to treat the output as a sequence of continuous vectors as opposed to a sequence of discrete alphabet symbols. This requires the output probabilities to be expressed as continuous probability functions, as opposed to single numeric values. Thus HMMs are often based on probability functions comprising one or more Gaussian distributions. When a plurality of Gaussian functions are used they are typically additively mixed together to define a complex probability distribution, as illustrated at 16.

Whether represented as a single Gaussian function or a mixture of Gaussian functions, the probability distributions can be described by a plurality of parameters. Like the transition probability values (Table 12) these output probability parameters may comprise floating point numbers. Parameters Table 18 identifies the parameters typically used to represent probability density functions (pdf) based on observed data from the training speakers. As illustrated by the equation in FIG. 1 at Gaussian function 16, the probability density function for an observation vector O to be modeled is the iterative sum of the mixture coefficient for each mixture component multiplied by the Gaussian density N, where the Gaussian density has a mean vector $n_j$ and covariance matrix U representing the cepstral or filter bank coefficient speech parameters.

The implementation details of a Hidden Markov Model recognizer may vary widely from one application to another. The HMM example shown in FIG. 1 is intended merely to illustrate how Hidden Markov Models are constructed, and is not intended as a limitation upon the scope of the present invention. In this regard, there are many variations on the Hidden Markov Modeling concept. As will be more fully understood from the description below, the eigenvoice adaptation technique of the invention can be readily adapted to work with each of the different Hidden Markov Model variations, as well as with other parameter-based speech modeling systems.

Constructing the Eigenvoice Space

Figure 2:
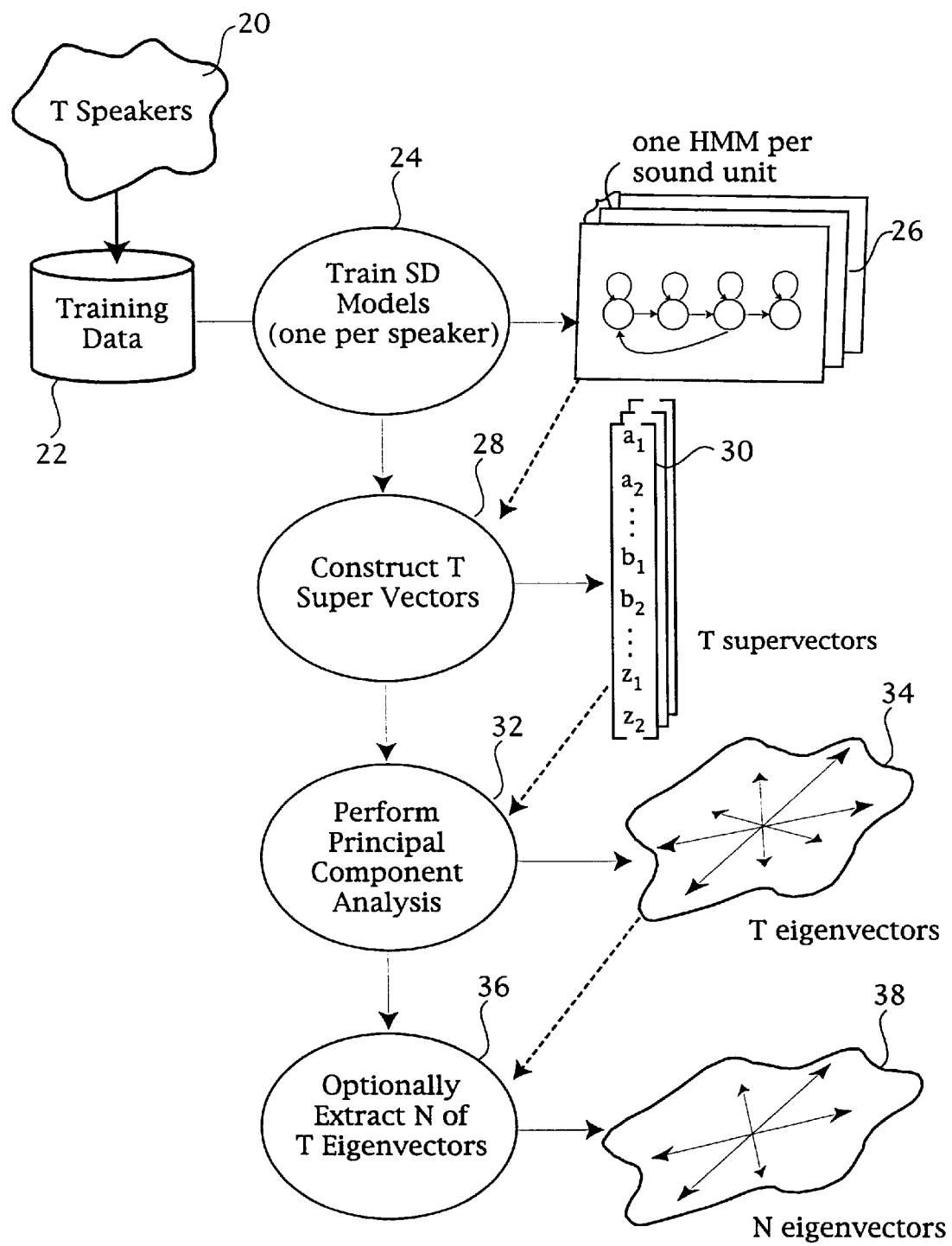
FIG. 2 is a dataflow diagram illustrating how to construct an eigenspace from a plurality of training speakers.

The process for constructing an eigenspace to represent a plurality of training speakers is illustrated in FIG. 2. The illustration assumes a number T of training speakers 20 provide a corpus of training data 22 upon which the eigenspace will be constructed. Preferably, a reasonably large number of speakers (on the order of 100 to 200) provide the training data. These training data are then used to train speaker dependent (SD) models as illustrated at 24. One model per speaker is constructed at step 24, with each model representing the sound space that is to be understood by the recognition system. In accordance with the description provided with FIG. 1, above, each model can be a set of HMMs, one HMM for each sound unit. This is illustrated in FIG. 2 at 26.

After all training data from T speakers have been used to train the respective speaker dependent models, a set of T supervectors is constructed at 28. Thus there will be one supervector 30 for each of the T speakers. The supervector for each speaker comprises an ordered list of parameters (typically floating point numbers) corresponding to at least a portion of the parameters 18 of the Hidden Markov Models for that speaker. Parameters corresponding to each sound unit are included in the supervector for a given speaker. The parameters may be organized in any convenient order. The order is not critical; however, once an order is adopted it must be followed for all T speakers.

The ordered Hidden Markov Model parameters are then concatenated to form the supervector. The choice of which HMM parameters to include in the supervector may depend on the available processing power. We have found that constructing supervectors from the Gaussian means gives good results. If greater processing power is available, the supervectors may also include other HMM parameters, such as the transition probabilities (Table 12, FIG. 1) or the Covariance matrix parameters (parameters 18, FIG. 1). Naturally, if the Hidden Markov Models generate discrete outputs (as opposed to probability densities) then these output values may be used to comprise the supervector.

After supervectors have been constructed for each of the training speakers, principal component analysis is performed at step 32. Principal component analysis upon T supervectors yields T eigenvectors, as at 34. Thus, if 120 training speakers have been used the system will generate 120 eigenvectors. These eigenvectors define what we call eigenvoice space or eigenspace.

The eigenvectors that make up the eigenvoice space are uncorrelated; they each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on. Our experiments with this technique thus far show that the first eigenvector appears to correspond to a male-female dimension.

Although a maximum of T eigenvectors is produced at step 32, in practice, it is possible to discard several of these eigenvectors, keeping only the first N eigenvectors. Thus at step 36 we optionally extract N of the T eigenvectors to comprise a reduced parameter eigenspace at 38. The higher order eigenvectors can be discarded because they typically contain less important information with which to discriminate among speakers. Reducing the eigenvoice space to fewer than the total number of training speakers provides an inherent data compression that can be helpful when constructing practical systems with limited memory and processor resources.

Performing the Adaptation

Figure 3:
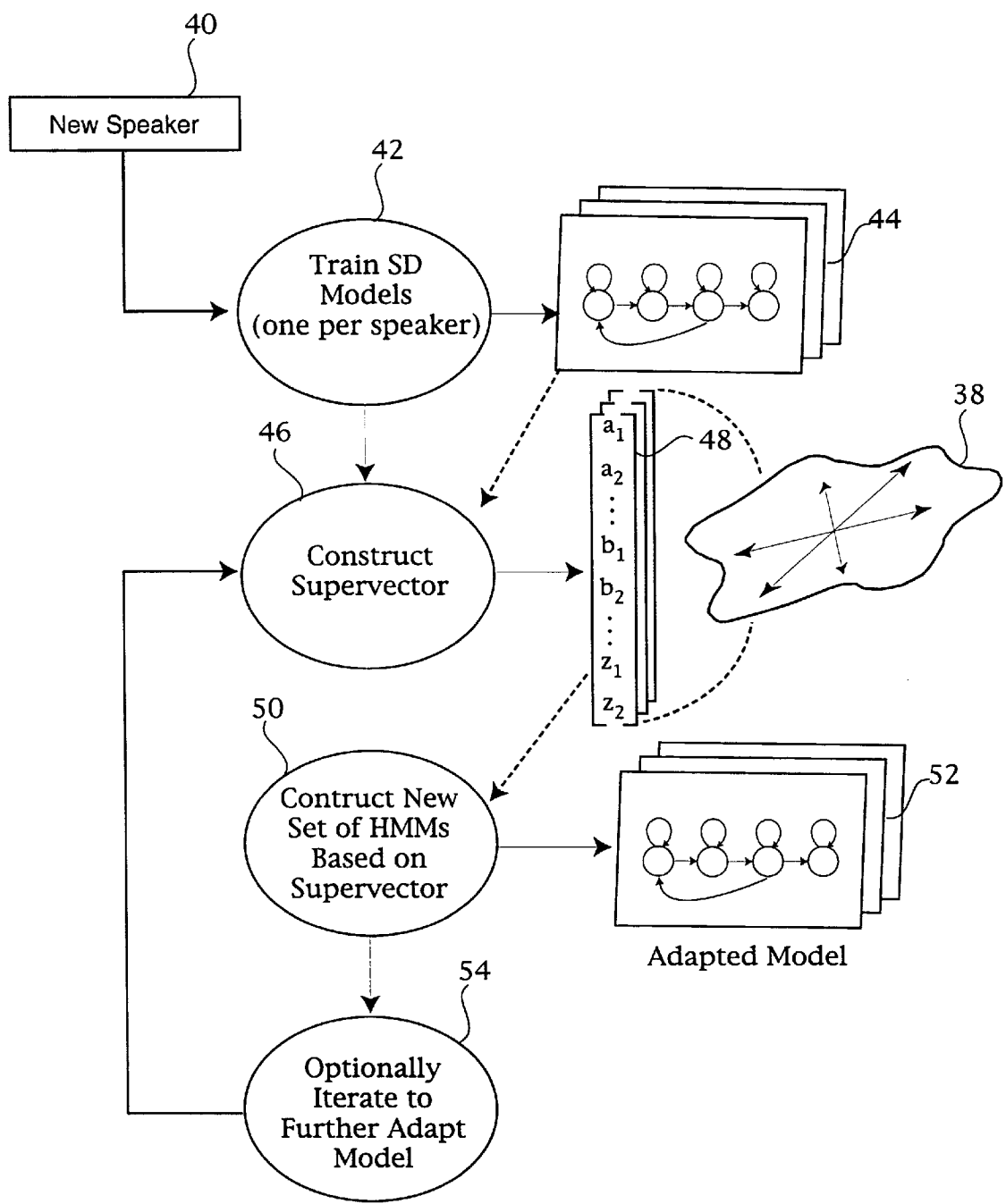
FIG. 3 is a dataflow diagram illustrating how an adapted model is constructed using the eigenvoices in accordance with the invention.

Once the eigenvoice space has been constructed, speaker adaptation or environment adaptation can be readily accomplished. While constructing the eigenspace is somewhat computationally intensive, and is typically conducted offline, adaptation is a comparatively simple computational operation that can be performed while the new speaker is using the system. Referring to FIG. 3, speech from new speaker 40 is used at step 42 to compute statistics from the parameters of the HMMs 44 hereinafter referred to as extracted statistics (one for each sound unit). The model built with the extracted statistics in either a supervised mode, where the training system knows the content of the training speech in advance, or in an unsupervised mode, where the speech recognition system uses a speaker independent model to determine the content of the adaptation speech.

The model built with the extracted statistics will usually be very inadequate for recognition, at least at first. The supervector is constructed at step 46 such that the supervector (supervector 48) is constrained to fall within the eigenvoice space 38 previously created from the training speakers. Supervector 48 is constructed with the imposed constraint that the HMM model used for recognition must be a linear combination of the eigenvoices comprising eigenvoice space 38.

The extracted statistics 44 serve to estimate the linear combination of coefficients that will comprise the adapted model for that new speaker. Thus in step 50 a new set of HMMs is constructed based on supervector 48 to generate the adapted model 52. If desired, an optional iterative process may be performed at 54 to construct a new supervector from the adapted model 52 and thereafter to construct another set of HMMs from which a further adapted model may be constructed.

Figure 4:
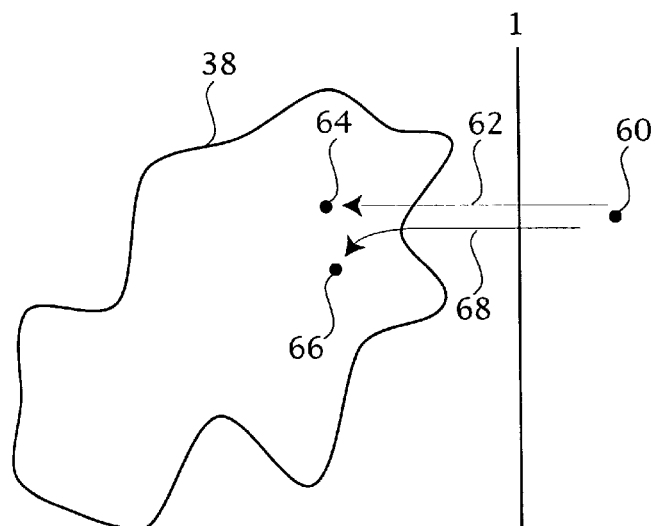
FIG. 4 is a simplified (two dimensional) illustration of eigenspace, comparing the projection operation with the maximum likelihood operation of the invention.

FIG. 4 illustrates, in two dimensional space, the process by which the speech model of a new speaker is constrained within the eigenspace 38. As noted above, the eigenspace is a multi- dimensional space of order less or equal to the number of eigenvectors generated through principal component analysis. Only two dimensions are illustrated in FIG. 4, to simplify the illustration, but it will be understood that eigenspace 38 is typically of much higher order than two.

The new speaker is shown diagrammatically by data point 60. Data point 60 would correspond to the supervector 48 shown in FIG. 3. Note that the new speaker at 60 lies outside eigenspace 38. As discussed above, the adaptation procedure involves finding a point within eigenspace that represents a good adapted model for this new speaker. The adapted model is based on the input speech uttered by the new speaker, but also constrained to be within eigenspace 38.

One simple technique for placing the new speaker within eigenspace is to use a simple projection operation illustrated by line 62. A projection operation finds the point within eigenspace that is as close as possible to the point outside of eigenspace corresponding to the new speaker's input speech. Thus the simple projection would place the new speaker at point 64 within eigenspace 38. It bears noting that these points are actually supervectors from which a set of HMMs can be reconstituted.

The projection operation is a comparatively crude technique that does not guarantee that the point within eigenspace is optimal for the new speaker. Furthermore, the projection operation requires that the supervector for the new speaker contain a complete set of data to represent the entire set of HMMs for that speaker. This requirement gives rise to a significant practical limitation. When using projection to constrain a new speaker to the eigenspace, that speaker must supply enough input speech so that all speech units are represented in the data. For example, if the Hidden Markov Models are designed to represent all phonemes in the English language, then the training speaker must supply examples of all phonemes before the simple projection technique can be used. In many applications this constraint is simply not practical.

The maximum likelihood technique of the invention addresses both of the above-mentioned drawbacks of simple projection. The maximum likelihood technique of the invention finds a point 66 within eigenspace 38 that represents the supervector corresponding to a set of Hidden Markov Models that have the maximum probability of generating the speech supplied by the new speaker. For illustration purposes, the maximum likelihood process is illustrated by line 68 in FIG. 4.

Whereas the simple projection operation treats all members of the supervector as having equal importance, the maximum likelihood technique is based on probabilities arising from the actual adaptation data and thus tends to weight the more probable data more heavily. Unlike the simple projection technique, the maximum likelihood technique will work even if the new speaker has not supplied a full set of training data (i.e., data for some of the sound units are missing). In effect, the maximum likelihood technique takes into account the context under which the supervectors are constructed, namely from Hidden Markov Models involving probabilities that certain models are more likely than others to generate the input speech supplied by the new speaker.

In practical effect, the maximum likelihood technique will select the supervector within eigenspace that is the most consistent with the new speaker's input speech, regardless of how much input speech is actually available. To illustrate, assume that the new speaker is a young female native of Alabama. Upon receipt of a few uttered syllables from this speaker, the maximum likelihood technique will select a point within eigenspace that represents all phonemes (even those not yet represented in the input speech) consistent with this speaker's native Alabama female accent.

Figure 5:
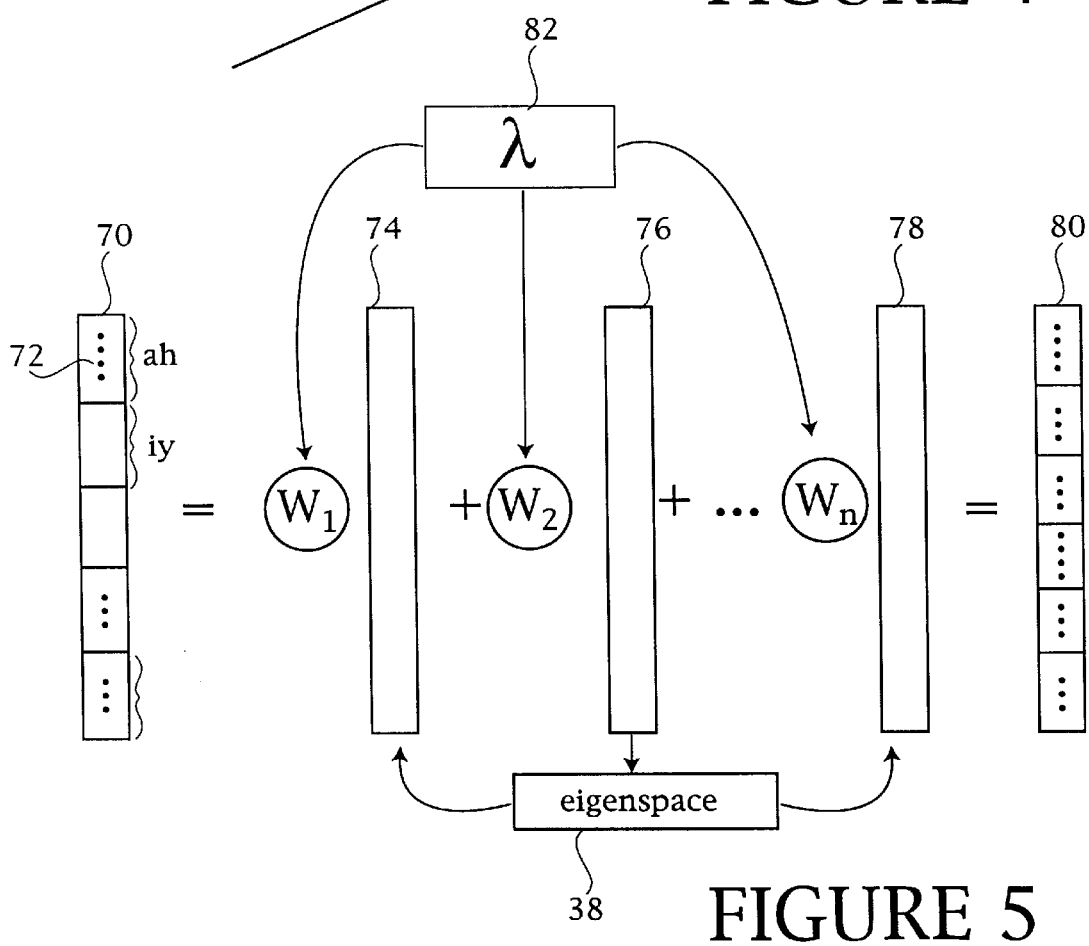
FIG. 5 is a data structure diagram illustrating how the observation data from a new speaker is transformed through eigenspace into an adapted model in accordance with the invention.

FIG. 5 shows how the maximum likelihood technique works. The input speech from the new speaker is used to extracted statistics for each parameter in the supervector 70. As explained above, the supervector comprises a concatenated list of speech parameters, corresponding to cepstral coefficients or the like. In the illustrated embodiment these parameters are floating point numbers representing the Gaussian means extracted from the set of Hidden Markov Models corresponding to the new speaker. Other HMM parameters may also be used. In the illustration these HMM means are shown as dots, as at 72. When fully populated with data, supervector 70 would contain floating point numbers for each of the HMM means, corresponding to each of the sound units represented by the HMM models. For illustration purposes it is assumed here that the parameters for phoneme "ah" are present but parameters for phoneme "iy" are missing.

The eigenspace 38 is represented by a set of eigenvectors 74, 76 and 78. The supervector 70 corresponding to the observation data from the new speaker may be represented in eigenspace by multiplying each of the eigenvectors by a corresponding eigenvalue, designated $W_1, W_2 \ldots W_n$. These eigenvalues are initially unknown. The maximum likelihood technique finds values for these unknown eigenvalues. As will be more fully explained, these values are selected by seeking the optimal solution that will best represent the new speaker within eigens pace.

After multiplying the eigenvalues with the corresponding eigenvectors of eigenspace 38 and summing the resultant products, an adapted model 80 is produced. Whereas the extracted statistics of the input speech (supervector 70) may have had some missing parameter values (the "iy" parameters, for example), the supervector 80 representing the adapted model is fully populated with values. That is one benefit of the invention. Moreover, the values in supervector 80 represent the optimal solution, namely that which has the maximum likelihood of representing the new speaker in eigenspace.

The individual eigenvalues $W_1, W_2 \ldots W_n$ may be viewed as comprising a maximum likelihood vector, herein referred to as maximum likelihood vector . FIG. 4 illustrates vector diagrammatically at 82. As the illustration shows, maximum likelihood vector 82 comprises the set of eigenvalues $W_1, W_2 \ldots W_n$.

Figure 6:
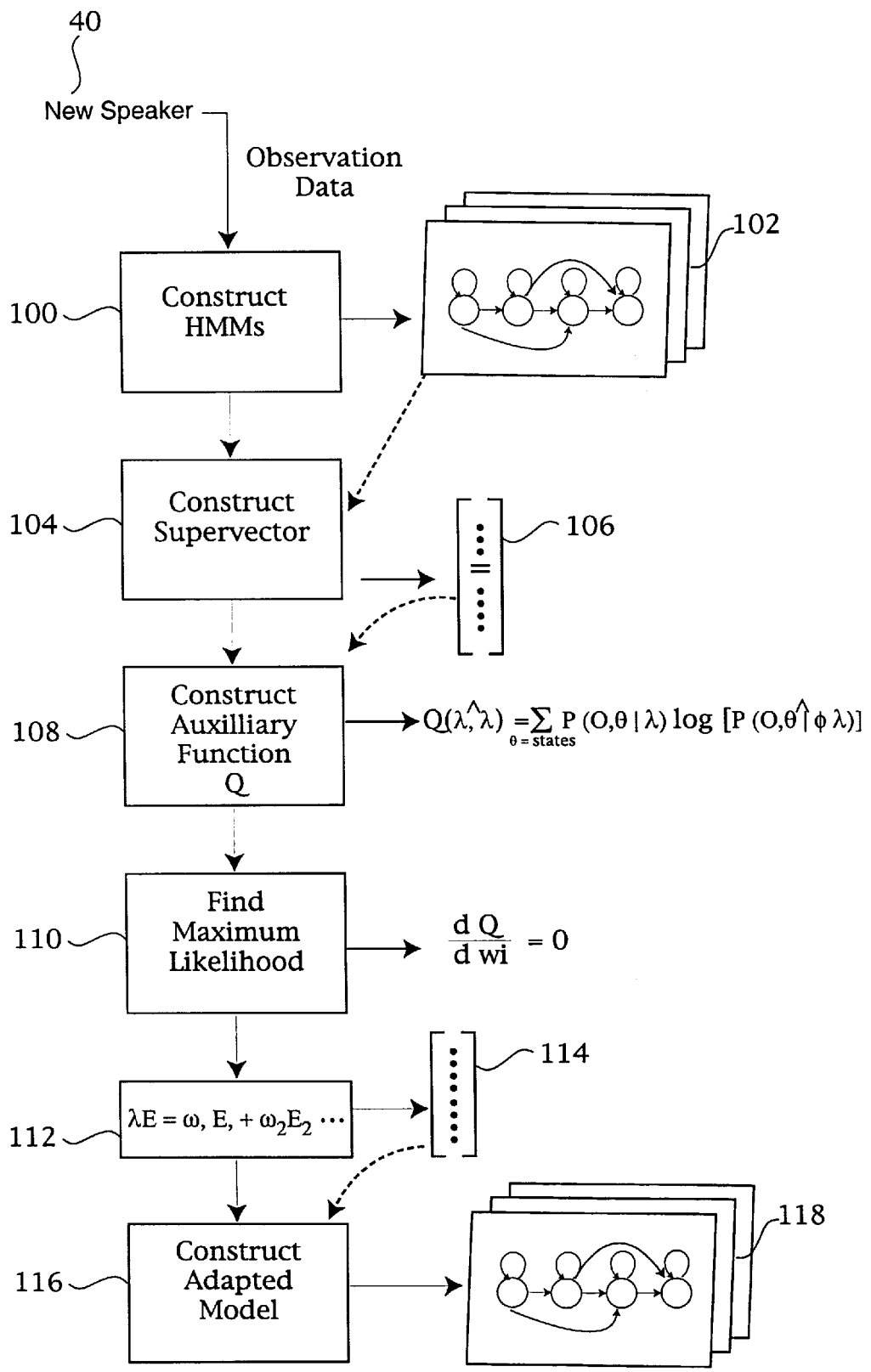
FIG. 6 is a flowchart diagram illustrating the maximum likelihood eigenspace adaptation process of the invention.

The procedure for performing adaptation using the maximum likelihood technique is shown in FIG. 6. Speech from a new speaker is used to extract a set of statistics, comprising the observation data, extracted statistics as depicted at 100. The set of HMMs 102 is then used in constructing a supervector as depicted at 104. As illustrated, the extracted statistics could be used to build a set of HMM models 102.

Using the supervector 106, an auxiliary function Q is constructed at 108. The presently preferred embodiment employs an auxiliary function that represents the probability of generating the observed data for the pre-defined set of HMM model s 102. Subsequent manipulation of the probability function Q is made easier if the function includes not only a auxiliary term P but also the logarithm of that term, log P.

The auxiliary function is then maximized at step 110 by taking the derivative of the auxiliary function individually with respect to each of the eigenvalues $W_1, W_2 \ldots W_n$. For example, if the eigenspace is of dimension 100, this system calculates 100 derivatives of the auxiliary function Q setting each to zero and solving for the respective W. While this may seem like a large computation, it is far less computationally expensive than performing the thousands of computations typically required of conventional MAP or MLLR techniques.

The resulting set of Ws, so obtained, represent the eigenvalues needed to identify the point in eigenspace corresponding to the point of maximum likelihood. Thus the set of Ws comprises a maximum likelihood vector in eigenspace. In this regard, each of the eigenvectors (eigenvectors 74, 76 and 78 in FIG. 5) define a set of orthogonal vectors or coordinates against which the eigenvalues are multiplied to define a point constrained within eigenspace. This maximum likelihood vector, depicted at 112, is used to construct supervector 114 corresponding to the optimal point in eigenspace (point 66 in FIG. 4). Supervector 114 may then be used at step 116 to construct the adapted model 118 for the new speaker.

In the context of the maximum likelihood framework of the invention, we wish to maximize the likelihood of an observation $O=o_1 \ldots o_T$ with regard to the model $\lambda$. This may be done by iteratively maximizing the auxiliary function Q (below), where $\lambda$ is the current model at the iteration and $\hat{\lambda}$ is the estimated model . We have:

$$Q(\lambda, \hat{\lambda}) = \sum_{\theta \in states} P(O, \theta | \lambda) \log[P(O, \theta | \hat{\lambda})]$$

As a preliminary approximation, we might want to carry out a maximization with regards to the means only. In the context where the probability P is given by a set of HMMs, we obtain the following:

$$Q(\lambda, \hat{\lambda}) =$$

$$\text{constant} - \frac{1}{2} P(O | \lambda) \sum_{\substack{states \\ in \lambda}}^{S_\lambda} \sum_{\substack{mist \\ gausst \\ inS}}^{M_s} \sum_{time}^{T} \{\gamma_m^{(s)}(t)[n\log(2\pi) + \log|C_m^{(s)-1}| + h(o_t, s)]\}$$

where:

$h(o_t, s) = (o_t - \hat{\mu}_m^{(s)})^T C_m^{(s)-1} (o_t - \hat{\mu}_m^{(s)})$ and let:

$o_t$ be the feature vector at time t $C_m^{(s)-1}$ be the inverse covariance for mixture gaussian m of state s $\hat{\mu}_m^{(s)}$ be the approximated adapted mean for state s, mixture component m $\gamma_m^{(s)}(t)$ be the P(using mix gaussian m$|\lambda, o_t$ Suppose the gaussian means for the HMMs of the new speaker are located in eigenspace. Let this space be spanned by the mean supervectors $\bar{\mu}_j$ with j=1 . . .E, $$\bar{\mu}_j = \begin{bmatrix} \bar{\mu}_1^{(1)}(j) \\ \bar{\mu}_2^{(1)}(j) \\ \vdots \\ \bar{\mu}_m^{(s)}(j) \\ \bar{\mu}_{Ms_\lambda}^{(S_\lambda)}(j) \end{bmatrix}$$

where $\bar{\mu}_m^{(s)}(j)$ represents the mean vector for the mixture gaussian m in the state s of the eigenvector (eigenmodel) j.

Then we need:

$$\bar{\mu}_j = \begin{bmatrix} \bar{\mu}_1^{(1)}(j) \\ \bar{\mu}_2^{(1)}(j) \\ \vdots \\ \bar{\mu}_m^{(s)}(j) \\ \bar{\mu}_{Ms_\lambda}^{(S_\lambda)}(j) \end{bmatrix} = \sum_{j=1}^{E} w_j \bar{\mu}_j$$

The $\bar{\mu}_j$ are orthogonal and the $w_j$ are the eigenvalues of our speaker model. We assume here that any new speaker can be modeled as a linear combination of our database of observed speakers. Then $$\hat{\mu}_m^{(s)} = \sum_{j=1}^{E} w_j \bar{\mu}_m^{(s)}(j)$$

with s in states of $\lambda$, m in mixture gaussians of M.

Since we need to maximize Q, we just need to set $$\frac{\partial Q}{\partial w_e} = 0, \quad e = 1 \ldots E.$$

(Note that because the eigenvectors are orthogonol, $$\frac{\partial w_i}{\partial w_j} = 0, i \neq j \ldots )$$

Hence we have $$\frac{\partial Q}{\partial w_e} = 0 = \sum_{\substack{states \\ in\lambda}}^{S_\lambda} \sum_{\substack{mixt \\ gausst \\ inS}}^{M_s} \sum_{time}^{T} \left\{ \frac{\partial}{\partial w_e} \gamma_m^{(s)}(t) h(o_t, s) \right\}, \quad e = 1 \ldots E.$$

Computing the above derivative, we have:

$$0 = \sum_s \sum_m \sum_t \gamma_m^{(s)}(t) \left\{ -\bar{\mu}_m^{(s)T}(e) C_m^{(s)-1} o_t + \sum_{j=1}^{E} w_j \bar{\mu}_m^{(s)T}(j) C_m^{(s)-1} \bar{\mu}_m^{(s)}(e) \right\}$$

from which we find the set of linear equations $$\sum_s \sum_m \sum_t \gamma_m^{(s)}(t) \bar{\mu}_m^{(s)T}(e) C_m^{(s)-1} o_t =$$

$$\sum_s \sum_m \sum_t \gamma_m^{(s)}(t) \sum_{j=1}^{E} w_j \bar{\mu}_m^{(s)T}(j) C_m^{(s)-1} \bar{\mu}_m^{(s)}(e), \quad j = e \ldots E.$$

Environment Adaptation

While the invention has been described thus far as a speaker adaptation technique, the techniques can be readily extended to environment adaptation. Many speech recognition systems are quite sensitive to environmental conditions, such as microphone placement, room acoustics, background noise, and audio signal channel quality, for example. The eigenvectors can be used to model different speaking environments, just as they are used to model different speakers.

In most instances it is desirable to accommodate the needs of both speaker adaptation and environment adaptation. To do this we simply need to insure that the training speakers are recorded in a wide variety of environments. To obtain good performance, the number of training speakers and number of eigenvoices retained may need to be larger than is necessary for eigenvoice adaptation in a quiet environment. Otherwise, the procedure is the same as described above.

To construct a speaker independent system that adapts to the environment, but not to the speaker, a slight modification to the above technique is used. First, train E speaker independent models, where E is the number of different environments in the training data.

Each of the E models is trained on many different speakers in the same environment. Ideally, the E different recording environments will be as diverse as possible. Then, the egenvoice procedure is carried out as described above. In this case, the eigenvoice vectors will represent the components of variation between environments. Thus the first eigenvector may or may not represent the male-female dimension as it did in the speaker adaptation example.

While the invention has been described in its presently preferred embodiment, it will be appreciated that the invention can be adapted to a variety of different uses. Accordingly, the preceding examples are intended to teach the concepts of the invention without limitation upon the scope of the appended claims.

What is claimed is:

1. A method for performing speaker adaptation comprising the steps of:

constructing an eigenspace to represent a plurality of training speakers by providing a set of models for said training speakers, expressing said set of models as supervectors of a first predetermined dimension, and performing principal component analysis upon said supervectors to generate a set of principal component vectors of a second predetermined dimension substantially lower than said first predetermined dimension that define said eigenspace;

generating an adapted model, using input speech from a new speaker to generate a maximum likelihood vector and to train said adapted model, while using said set of principal component vectors and said maximum likelihood vector to constrain said adapted model such that said adapted model lies within said eigenspace.

2. The method of claim 1 wherein said step of generating a maximum likelihood vector comprises:

defining an auxiliary function representing the probability of generating an observed datum for a predefined set of models, in which said input speech supplies said observed datum; and maximizing said auxiliary function to find said maximum likelihood vector.

3. The method of claim 1 wherein said adapted model is constrained by multiplying said maximum likelihood vector with said principal component vectors.

4. The method of claim 2 wherein said maximizing step is performed by:

representing said maximum likelihood vector as a set of eigenvalue variables;

taking a first derivative of said auxiliary function with respect to said eigenvalue variables; and solving for the corresponding values of said eigenvalue variables when said first derivative is equated to zero.

* * * * *